US012623308B2

(12) United States Patent
Dyshko et al.

(10) Patent No.: US 12,623,308 B2
(45) Date of Patent: May 12, 2026

(54) REMOVABLE STOP-OFF MATERIAL FOR BRAZING

(71) Applicant: PRINCE & IZANT, LLC, Cleveland, OH (US)

(72) Inventors: Kristina Pavlovna Dyshko, North Royalton, OH (US); Warren Martin Andre Miglietti, Jupiter, FL (US)

(73) Assignee: Prince & Izant, LLC, Cleveland, OH (US)

( * ) Notice: Subject to any disclaimer, the term of this patent is extended or adjusted under 35 U.S.C. 154(b) by 0 days.

(21) Appl. No.: 18/585,429

(22) Filed: Feb. 23, 2024

(65) Prior Publication Data

US 2024/0286229 A1 Aug. 29, 2024

Related U.S. Application Data

(60) Provisional application No. 63/487,075, filed on Feb. 27, 2023.

(51) Int. Cl.
| | |
|---|---|
| *B23K 35/00* | (2006.01) |
| *B23K 1/018* | (2006.01) |
| *B23K 1/20* | (2006.01) |
| *B23K 35/22* | (2006.01) |
| *B23K 35/36* | (2006.01) |

(52) U.S. Cl.
CPC ............ *B23K 35/224* (2013.01); *B23K 1/018* (2013.01); *B23K 1/20* (2013.01); *B23K 35/3602* (2013.01)

(58) Field of Classification Search
CPC ........ B23K 35/224; B23K 1/018; B23K 1/20; B23K 35/3602; B23K 1/0018; B23K 1/19; B23K 35/0244; B23K 2101/001; F05D 2230/237; F05D 2230/72; F05D 2230/80; F05D 2300/125; F01D 5/005
USPC .......................................................... 228/39
See application file for complete search history.

(56) References Cited

U.S. PATENT DOCUMENTS

| | | | | |
|---|---|---|---|---|
| 2,473,887 A | * | 6/1949 | Jennings ................... | B23K 1/18 |
| | | | | 427/310 |
| 3,089,780 A | | 5/1963 | Siple | |
| 3,623,921 A | | 11/1971 | Behringer et al. | |
| 3,750,266 A | | 8/1973 | Hikido et al. | |
| 3,906,617 A | * | 9/1975 | Behringer ................ | B05D 1/32 |
| | | | | 228/118 |

(Continued)

FOREIGN PATENT DOCUMENTS

| | | | | |
|---|---|---|---|---|
| CN | 107877036 A | | 4/2018 | |
| CN | 108237278 A | * | 7/2018 | ............... B23K 1/20 |

(Continued)

OTHER PUBLICATIONS

Braz-Stop Materials Datasheet; HTK Hamburg GmbH— Oehleckerring 32, 22419 Hamburg; www.htk-hamburg.com; dated May 6, 2021; 1 page.

(Continued)

*Primary Examiner* — Kiley S Stoner
(74) *Attorney, Agent, or Firm* — Tucker Ellis LLP

(57) ABSTRACT

Provided herein is a stop-off material for a brazing process. The stop-off material includes a solvent, a thickener, and magnesium oxide. About 5 weight percent to about 60 weight percent of the stop-off material comprises the magnesium oxide. The stop-off material is configured to be removed from a surface after heating and via air pressure.

20 Claims, 8 Drawing Sheets

(56) References Cited

U.S. PATENT DOCUMENTS

| | | | |
|---|---|---|---|
| 4,125,647 | A | 11/1978 | Goto et al. |
| 4,293,089 | A * | 10/1981 | McCormick ............. B23K 1/20 |
| | | | 228/262.3 |
| 4,325,754 | A * | 4/1982 | Mizuhara ............... B23K 35/22 |
| | | | 419/10 |
| 4,477,527 | A | 10/1984 | Grosner |
| 5,024,368 | A * | 6/1991 | Bottomley .......... B23K 35/224 |
| | | | 228/214 |
| 6,240,640 | B1 | 6/2001 | Matsuoka et al. |
| 6,921,014 | B2 * | 7/2005 | Hasz ................... C23C 28/3455 |
| | | | 29/889.721 |
| 7,549,489 | B2 | 6/2009 | Hall et al. |
| 8,020,471 | B2 | 9/2011 | Hall et al. |
| 8,047,771 | B2 | 11/2011 | Tucker et al. |
| 2024/0165725 | A1* | 5/2024 | Mccordic ............... B23K 1/008 |
| 2024/0286229 | A1* | 8/2024 | Dyshko .............. B23K 35/3602 |

FOREIGN PATENT DOCUMENTS

| | | | | |
|---|---|---|---|---|
| CN | 111805108 | A * | 10/2020 | ......... B23K 35/3602 |
| EP | 3360637 | | 8/2018 | |
| GB | 2075891 | A * | 11/1981 | .......... B23K 35/224 |
| JP | 01062266 | A * | 3/1989 | |
| JP | 2512763 | B2 * | 7/1996 | |

OTHER PUBLICATIONS

MDG-136 Fusion CRT Stop-off; Protect metal surfaces from braze filler metal flow; Fusion incorporated, Willoughby, OH; www.fusion-inc.com; Aug. 2013; 1 page.

MSDS595; Stop-off 470W, 470WMI, 470 WM2, and 470P; Safety Data Sheet; Lucas-Milhaupt, Inc. www.lucasmilhaupt.com; dated Jul. 22, 2014; 7 pages.

Wallcolmonony Ltd. (UK); Material Safety Data Sheet; NICROBRAZ Green Stop-off type II; Wallcolmonoy Hi-Temp Brazing Alloys; dated Jun. 17, 2015; 8 pages.

Nicrobraz Green Stop-off Type I; Material Safety Data Sheet; dated Jul. 14, 2010; 3 pages.

Johnson Mattey Meal Joining; Brazing Consumables; Stop-Flo Stop-Off for Brazing Filler Metal; dated May 5, 2021; 1 page.

Brazelet Stop-Off; Hoganas; www.hoganas.com/brazing; 2021; 2 pgs.

International Search Report and the Written Opinion of the International Searching Authority—PCT/US2024/017054 mailed Jun. 24, 2024; 29 pages.

* cited by examiner

102

102

108

110

116

112

1710

124

112

1710

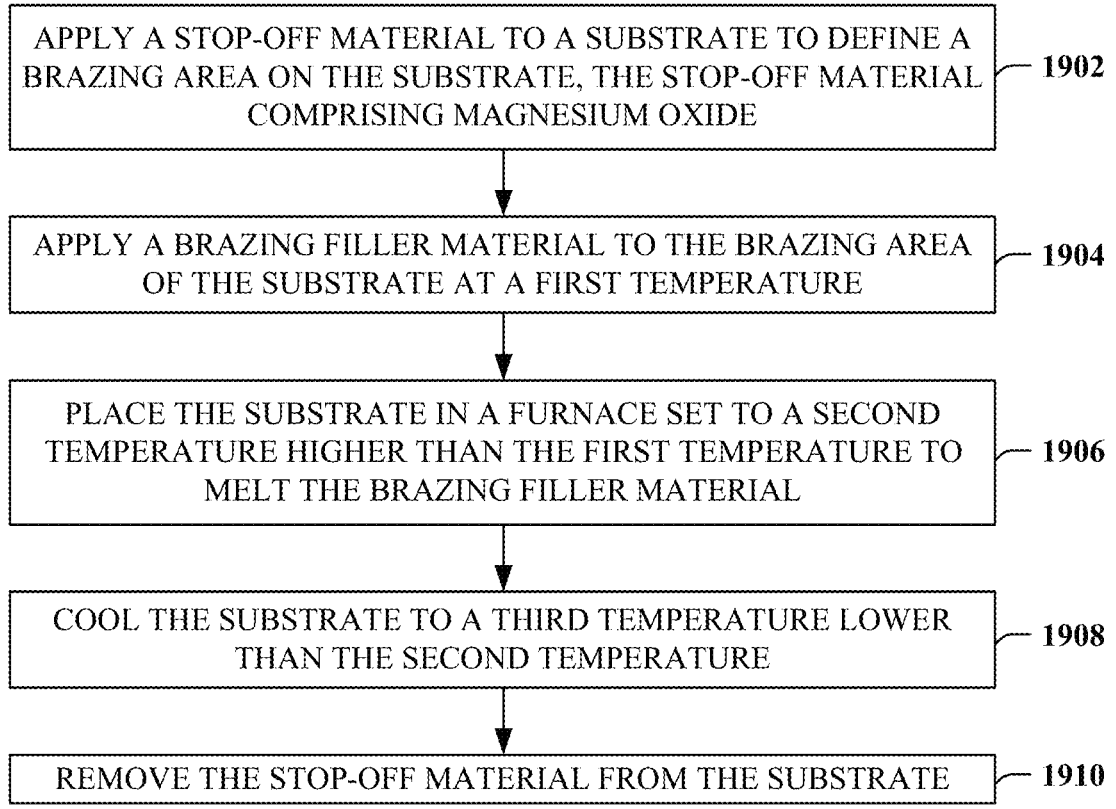

APPLY A STOP-OFF MATERIAL TO A SUBSTRATE TO DEFINE A BRAZING AREA ON THE SUBSTRATE, THE STOP-OFF MATERIAL COMPRISING MAGNESIUM OXIDE — 1902

APPLY A BRAZING FILLER MATERIAL TO THE BRAZING AREA OF THE SUBSTRATE AT A FIRST TEMPERATURE — 1904

PLACE THE SUBSTRATE IN A FURNACE SET TO A SECOND TEMPERATURE HIGHER THAN THE FIRST TEMPERATURE TO MELT THE BRAZING FILLER MATERIAL — 1906

COOL THE SUBSTRATE TO A THIRD TEMPERATURE LOWER THAN THE SECOND TEMPERATURE — 1908

REMOVE THE STOP-OFF MATERIAL FROM THE SUBSTRATE — 1910

FIG. 19

REMOVABLE STOP-OFF MATERIAL FOR BRAZING

RELATED APPLICATIONS

This application claims priority to and the benefit of U.S. Provisional Application No. 63/487,075 filed on Feb. 27, 2023, the entirety of which is incorporated herein by reference.

TECHNICAL FIELD

In general, the present invention relates to a stop-off material for brazing and methods for using and removing the stop-off material.

BACKGROUND OF THE INVENTION

Brazing is a method used to join two or more base materials together using brazing filler materials with liquidus temperatures above 450 degrees Celsius. At least one of the metal pieces may be partially coated with a stop-off material, which defines an area of the base material for the brazing filler material to flow.

SUMMARY OF THE INVENTION

In accordance with an embodiment of the present invention, a stop-off material is disclosed, which comprises a solvent, a thickener, and magnesium oxide. About 5 weight percent to about 60 weight percent of the stop-off material comprises the magnesium oxide.

In accordance with another embodiment of the present invention, a stop-off material is disclosed. The stop-off material comprises a solvent, a thickener, and an amount of magnesium oxide such that the stop-off material is configured to be removed from a surface after heating via air pressure.

In accordance with still another embodiment of the present invention, a method of brazing is disclosed. The method includes applying a stop-off material to a substrate to define a brazing area of the substrate. The stop-off material comprises magnesium oxide. A brazing filler material is applied to the brazing area of the substrate at a first temperature. The brazing filler material is heated to a second temperature greater than the first temperature. The second temperature is greater than a liquidus temperature of the brazing filler material. The substrate and brazing filler material are cooled to third temperature lower than the second temperature. The stop-off material is removed from the substrate.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 19 provides a flow chart of some embodiments of the brazing method and stop-off material disclosed herein.

DETAILED DESCRIPTION OF THE INVENTION

Figures 1, 2:
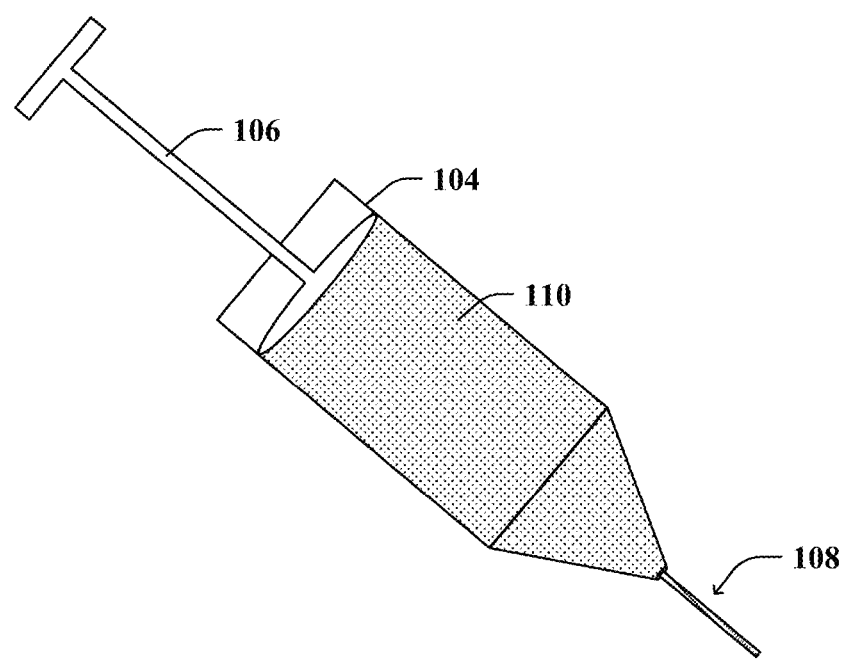
FIG. 1 illustrates some embodiments of a stop-off material loaded in a syringe.
FIGS. 2, 3A, 3B, 4, 5, 6, and 7 illustrate some embodiments of a method for using a stop-off material for brazing on a substrate and removing the stop-off material from the substrate after brazing.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Embodiments of the invention relate to methods and systems of a stop-off material and methods of using the stop-off material. Before brazing, a stop-off material may be applied to a substrate, such as a metal piece, to define a brazing area on the metal piece. The stop-off material defines a perimeter for a brazing area such that the stop-off material is not included in the brazing area. During brazing, the stop-off material prevents a brazing filler material from spreading past the defined brazing area. Brazing is conducted by joining two or more base materials together using brazing filler materials that have a liquidus temperature above 450 degrees Celsius. A liquidus temperature is the temperature at which a liquid-form of brazing filler material begins to solidify upon cooling. Thus, the stop-off material is formulated to withstand high temperatures while still preventing the brazing filler material from spreading onto the metal piece covered by the stop-off material. After brazing, the stop-off material may be removed to re-expose the metal piece. Removal of the stop-off material and re-exposure of the metal piece may be conducted for aesthetics, function, subsequent manufacturing steps, or the like. Various embodiments of the present disclosure relate to a stop-off material comprising magnesium oxide such that the stop-off material can be easily removed from a surface after brazing to reduce contamination on the surface.

Turning now to FIG. 1, a syringe 102 filled with a stop-off material 110 is illustrated. The syringe 102 comprises a housing 104 and a plunger 106. The stop-off material 110 is dispensed through a needle 108 of the syringe 102 when the plunger 106 is pushed towards the needle 108. In some embodiments, the stop-off material 110 comprises a solvent, a thickener, and magnesium oxide. In some embodiments, the solvent may comprise, some suitable solvent that can dissolve the thickener and does not impose a health hazard. For example, in some embodiments, the solvent comprises dipropylene glycol methyl ether because of its moderate drying time and its ability to dissolve the thickener. The "moderate drying time" of dipropylene glycol methyl ether means that the solvent does not dry too quickly such that handling time is rushed, but also that the solvent does not dry too slowly such that processing time is prolonged at high and/or room temperatures.

In some embodiments, during production of the stop-off material 110, the solvent and thickener may be mixed together to form a solvent-thickener mixture, where the thickener dissolves in the solvent. Then, the magnesium oxide may be mixed into and suspended in the solvent-thickener mixture. In other embodiments, the solvent, thickener, and magnesium oxide may be mixed together in any order.

In some embodiments, the thickener may comprise a suitable material, such as a polymer, that dissolves within the solvent and increases the thickness or viscosity of the solvent such that the resulting solvent-thickener mixture has a gel-like consistency. Additionally, the thickener may be selected based on its solvent compatibility, high molecular weight, and burn-off properties. A thickener having a high molecular weight reduces the amount of thickener needed to achieve a gel-like solvent-thickener mixture. In some embodiments, the solvent-thickener mixture may comprise about 97 percent by weight (wt %) to about 99.5 wt % of the solvent and about 1 wt % to about 3 wt % of the thickener. Less than 1 wt % of thickener in the solvent-thickener mixture would result in a solvent-thickener mixture that has too low of a viscosity for distribution of the magnesium oxide within the solvent-thickener mixture. Thus, the magnesium oxide would separate from the solvent-thickener mixture over time. More than 3 wt % of the thickener in the solvent-thickener mixture would result in a solvent-thickener mixture that has too high of a viscosity for efficient application methods while also limiting carbon residue content on a surface after brazing. Thus, the amount of thickener in the solvent-thickener mixture may be chosen based on a desired viscosity for a desired application method of the stop-off material 110. In some embodiments, for example, the solvent-thickener mixture may comprise about 98.5 wt % of the solvent and about 1.5 wt % of the thickener such that the solvent-thickener mixture is shelf-stable and limits carbon residue on a surface after brazing.

Further, about 20 wt % to about 40 wt % of the stop-off material 110 comprises the magnesium oxide. For example, in some embodiments, about 74 wt % of the stop-off material 110 comprises the solvent; about 1 wt % of the stop-off material 110 comprises the thickener; and about 25 wt % of the stop-off material 110 comprises magnesium oxide.

In some other embodiments, the stop-off material 110 is water-based and thus, comprises water, a cross-linking agent, a thickener, and magnesium oxide. In some embodiments, during production of the stop-off material 110, the water, cross-linking agent, and thickener may be mixed together to form a water-thickener mixture. Then, the magnesium oxide may be mixed into and suspended in the water-thickener mixture. In some embodiments, the water-thickener mixture may comprise about 92 wt % to about 98 wt % of deionized water, about 2 wt % to about 7 wt % of the cross-linking agent, and about 0.5 wt % to about 3 wt % of the thickener. For example, in some embodiments, about 99.5 wt % of the water-thickener mixture may comprise water and about 0.5 wt % of water-thickener mixture may comprise the thickener. In some embodiments, solvent-based stop-off materials 110 are more shelf-stable than water-based stop-off materials 110. For example, components in the water-based stop-off materials 110 may separate within their container over time and need mixing prior to using the stop-off material 110 compared to solvent-based stop-off materials 110.

FIGS. 2, 3A, 3B, 4, 5, 6, and 7 illustrate some embodiments of a method for using a stop-off material for brazing on a substrate and removing the stop-off material from the substrate after brazing.

Turning now to FIG. 2, the stop-off material 110 is dispensed onto a substrate 112 to define a brazing area 116 of the substrate 112. It will be appreciated that stop-off material 110 may be dispensed using some other method than the syringe 102 such as, for example, with a brush, spatula, cotton swab, or the like. In some embodiments, the substrate 112 comprises a metal, a metal alloy, a ceramic, a composite, or some other base material suitable for brazing. The substrate 112 may comprise, for example, aluminum, copper, silver, gold, nickel, cobalt, iron, titanium, chromium, alloys thereof, or some other suitable metal for brazing. In some embodiments, the substrate 112 may have a planar surface, a curved surface, a rough surface, or the like. In some embodiments, as illustrated in FIG. 2, the stop-off material 110 is dispensed in a closed ring-like pattern such that the brazing area 116 is defined by the inner perimeter of the stop-off material 110 and is completely surrounded by the stop-off material 110. In other embodiments, the stop-off material 110 may be dispensed in a line or opened ring-like pattern such that the brazing area 116 is not a completely enclosed area of the substrate 112. (see, e.g., FIG. 8).

The stop-off material 110 is a paste-like material with a certain viscosity such that the stop-off material 110 can be extruded from the needle 108 of the syringe. The gauge of the needle 108 of the syringe 102 and/or the viscosity of the stop-off material 110 may be adjusted such that the dispensed stop-off material 110 can be well-controlled at a desired speed and volume to improve the precision and accuracy of the brazing area 116. Additionally, the viscosity may influence the slump of the stop-off material 110. If the stop-off material 110 has a high slump after dispensing, the size of the brazing area 116 would change. As will be discussed further herein, the stop-off material 110 changes composition at high temperatures, so to prevent an undesired change in composition and for ease of application, the stop-off material 110 is dispensed onto the substrate 112 at room temperature, which will be defined herein as a first temperature.

Figure 3A:
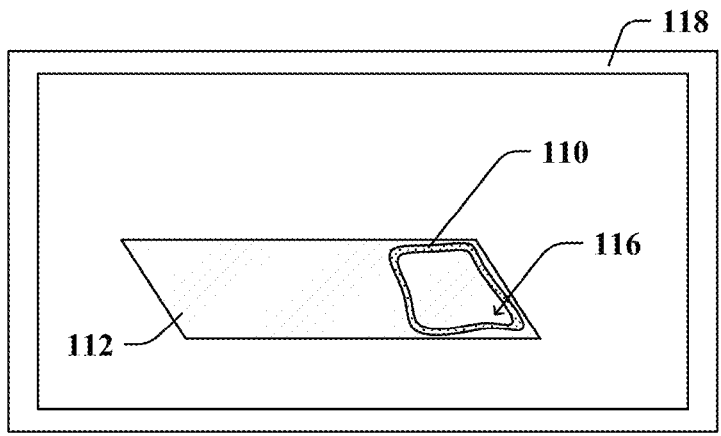

Turning now to FIG. 3A, in some embodiments, the substrate 112 with the stop-off material 110 is transferred into a furnace 118. In some embodiments, as shown in FIG. 3A, the substrate 112 is arranged as a flat surface within the furnace 118.

Figure 3B:
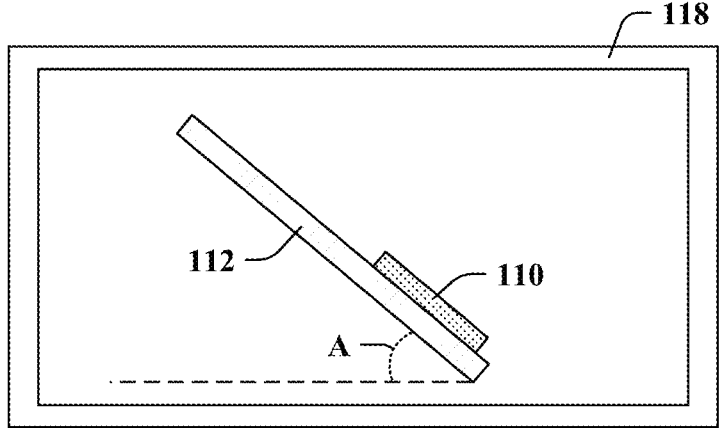

Turning now to FIG. 3B, in some other embodiments, the substrate 112 is arranged at an angle A within the furnace 118. In some such embodiments, the composition of the stop-off material 110 is formulated such that the viscosity of the stop-off material 110 is high enough and that the slump of the stop-off material 110 is low enough to prevent the stop-off material 110 from significantly sliding away from its intended position on the substrate 112. The angle A may be in a range from 0 degrees, as shown in FIG. 3A, to 180 degrees. Thus, in some embodiments, the stop-off material 110 has a high enough viscosity to resist the force of gravity when the angle A is equal to 180 degrees.

Figure 4:
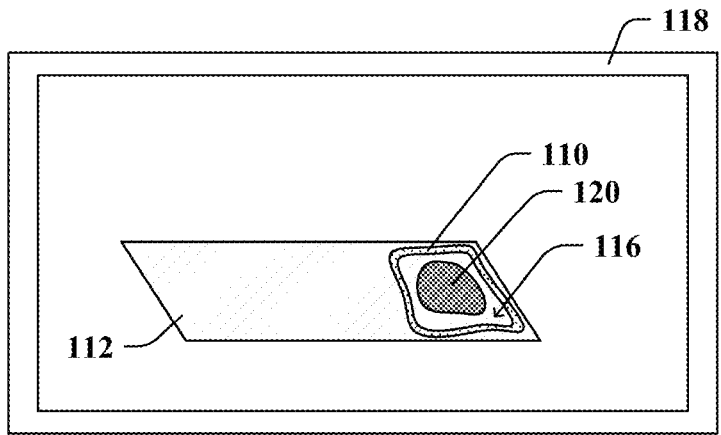

Turning now to FIG. 4, a brazing filler material 120 is applied to the substrate 112 and within the brazing area 116. In some embodiments, the brazing filler material 120 comprises a metal powder and a thickener. In some other embodiments, the brazing filler material 120 also comprises a flux to prevent oxidation on the substrate 112 during brazing. In some embodiments, a flux is separately applied to the brazing area 116 followed by application of the brazing filler material 120. In yet other embodiments, the brazing filler material 120 comprises only the brazing filler metal powder. In other embodiments, the brazing filler material 120 is applied to the brazing area 116 before the substrate 112 is placed into the furnace.

The magnesium oxide in the stop-off material 110 is the braze prohibiting ingredient, which prevents any molten brazing filler material 120 from spreading outside of the brazing area 116 and onto areas of the substrate 112. In some embodiments, the brazing filler material 120 at least comprises brazing metal powder(s) configured to melt and aid in joining two or more substrates together during brazing. The brazing metal powder may comprise, for example, aluminum, copper, silver, gold, nickel, cobalt, iron, titanium, chromium, alloys thereof, and/or some other suitable metal. In some embodiments, when the substrate 112 comprises a ceramic, the brazing filler material 120 comprises titanium, zirconium, hafnium, vanadium, chromium, or some other reactive ingredient that promotes wetting onto the ceramic material of the substrate 112. The brazing filler material 120 may be in the form of a paste, a tape, a powder, a pre-sintered preform, a wire, a rod, a ring, foil, a washer, a flat preform, or the like. The brazing filler material 120 has a liquidus temperature above 450 degrees Celsius. To prevent mixing between the stop-off material 110 and the brazing filler material 120 prior to brazing, the brazing filler material 120 is applied within the brazing area 116 but spaced apart from the stop-off material 110. Mixing between the stop-off material 110 and the brazing filler material 120 may compromise the effectiveness of the stop-off material 110 in preventing spread of the brazing filler material 120 during brazing.

Figure 5:
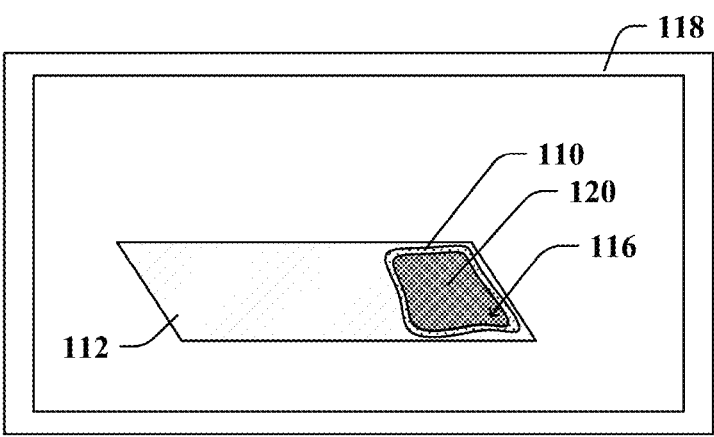

Turning now to FIG. 5, the furnace is set to a second temperature that is greater than the first temperature such that the brazing filler material 120 becomes molten and spreads on the substrate 112 and within the brazing area 116 defined by the stop-off material 110. In some embodiments, the second temperature is greater than 450 degrees Celsius. For example, in some embodiments, the second temperature is about 50 degrees Celsius greater than the liquidus temperature of the brazing filler material 120. The second temperature is lower than the degradation temperature of magnesium oxide. Further, when the second temperature is at least 50 degrees Celsius greater than the liquidus temperature of the brazing filler material 120, the brazing filler material 120 will be molten such that it is free-flowing. The free-flowing brazing filler material 120 may spread on the substrate 112 due to its viscosity, cohesive and adhesive forces, forces of gravity, capillary action, a combination thereof, and the like. In some embodiments, the furnace is held at the second temperature for a certain time period to ensure the brazing filler material 120 melts completely. The stop-off material 110 contains the brazing filler material 120 within the brazing area 116 because the magnesium oxide in the stop-off material 110 resists the wetting and flow of the brazing filler material 120. Further, the magnesium oxide in the stop-off material 110 has thermally stable oxygen bonds such that the stop-off material 110 can be effective at such high temperatures.

If the brazing filler material 120 comprises a thickener and solvent, some or all of the solvent may evaporate during the brazing such that only the metal filler powder remains. Further, during brazing, the solvent or water in the stop-off material 110 evaporates and the thickener decomposes such that the magnesium oxide and remaining thickener residue remain on the substrate 112. The magnesium oxide is thus loosely held in place on the substrate 112 by the remaining thickener residue. During brazing, another component may be attached to the substrate 112 at the brazing area 116. This will be discussed in more detail in FIGS. 8-12, for example.

In some embodiments, the substrate 112 is arranged directly on an oxide cloth. The oxide cloth may be arranged between the substrate 112 and the base of the furnace 118 such that any molten brazing filler material 120 does not contact the furnace 118 and bond the substrate 112 with the furnace 118.

Although the substrate 112, stop-off material 110, and brazing filler material 120 are loaded into a furnace 118 in FIGS. 3A-5 for furnace brazing, it will be appreciated that other brazing processes are also within the scope of disclosure such as, for example, vacuum brazing, induction brazing, resistance brazing, or some other brazing process. Thus, in some other embodiments, instead of loading the substrate 112 into the furnace at FIGS. 3A-5, the substrate 112 may instead be exposed to, for example, an induction coil to melt the brazing filler material 120 via induction brazing.

Figure 6:
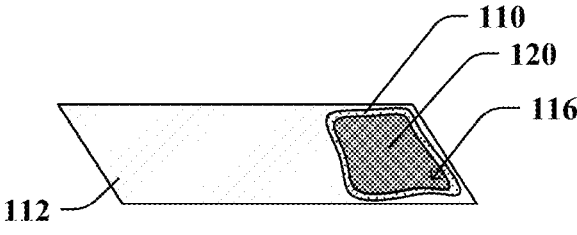

Turning now to FIG. 6, in some embodiments, the substrate 112 is removed from the furnace 118 and cooled to a third temperature. The third temperature may be equal to the first temperature, less than the first temperature, or between the first and second temperatures. It will be appreciated that in other embodiments, the substrate 112 may remain in the furnace while the furnace settings are adjusted to allow the substrate 112 to cool to the third temperature. Nevertheless, once the substrate 112 cools to the third temperature, the brazing filler material 120 is a solid metal bonded to the substrate 112 and the stop-off material 110 comprises magnesium oxide powder.

Figure 7:
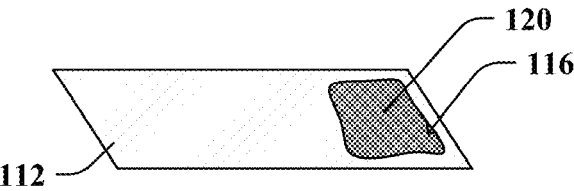

Turning now to FIG. 7, the magnesium oxide is removed from the substrate 112. The magnesium oxide may be removed via air pressure, which advantageously prevents damage and contamination to other parts of the substrate 112. The magnesium oxide reduces more easily than other metal-oxides commonly used in stop-offs, and thus, the magnesium oxide in this stop-off material 110 may break down more easily and effectively for easy removal compared to other commonly used stop-offs, such as those containing aluminum or titanium oxides. Additionally, in some embodiments, the thickener may comprise a polymer that easily burns off or easily decomposes and that can be removed with little residue after brazing.

In some other embodiments, the magnesium oxide may also be removed via a soft brush, acetone, some other suitable washing method, or a combination thereof. For example, in some embodiments, the remaining magnesium oxide and thickener is removed by a soft brush followed by compressed air and acetone. In some embodiments, the compressed air is released at a pressure of about 30 psi to about 90 psi. It will be appreciated that other air pressures may be used. In some embodiments, the compressed air is directed towards the substrate 112 at an angle that is less than 90 degrees with respect to the substrate surface such that the compressed air directs the magnesium oxide and thickener reside off of the substrate 112 and towards a same side or area of the substrate 112. For example, in some embodiments, the compressed air is directed at 45 degree angle with respect to the substrate 112. Additionally, the stop-off material 110 comprising magnesium oxide does not stain the underlying substrate 112. Removal of the stop-off material and re-exposure of the metal piece may be conducted for aesthetics, function, subsequent manufacturing steps, or the like.

The amount of magnesium oxide in the stop-off material 110 influences the properties of the stop-off material 110 such as slump, viscosity, extrudability, stop-off effectiveness, and post-brazing stop-off removal. In some embodiments, about 20 wt % to about 40 wt % of the stop-off material 110 comprises magnesium oxide. In other embodiments, about 15 wt % to about 45 wt % of the stop-off material 110 comprises magnesium oxide. In some other embodiments, about 10 wt % to about 50 wt % of the stop-off material 110 comprises magnesium oxide. In yet some other embodiments, about 5 wt % to about 60 wt % of the stop-off material 110 comprises magnesium oxide. In some embodiments, at least 5 wt % of the stop-off material 110 comprises magnesium oxide. In some other embodiments, at most 60 wt % of the stop-off material comprises magnesium oxide. Further, because any amount of magnesium oxide can provide some stop-off effect, in some other embodiments, about 0.25 wt % to about 100 wt % of the stop-off material 110 comprises magnesium oxide.

In embodiments where about 20 wt % to about 40 wt % of the stop-off material 110 comprises magnesium oxide, the stop-off material 110 is effective in containing the brazing filler material within the brazing area, has a workable and versatile viscosity, and also is easily removed after brazing. When less than 20 wt % of the stop-off material 110 comprises magnesium oxide, the stop-off material 110 is not as effective in preventing a brazing filler material from spreading onto other areas of a substrate 112 during brazing. When more than 40 wt % of the stop-off material 110 comprises magnesium oxide, the remaining stop-off material 110 after brazing is difficult to remove from the substrate 112, thereby leaving behind unwanted residue on the surface and/or damaging the substrate 112 during removal. Further, when about 20 wt % to about 40 wt % of the stop-off material 110 comprises magnesium oxide, the effectiveness and removability of the stop-off material 110 is maintained even when brazing is conducted over a long period of time, such as, for example, twelve hours during the diffusion brazing process. Therefore, this magnesium oxide stop-off material 110 can be used in a variety of brazing methods.

Additionally, as the weight percent of magnesium oxide in the stop-off material 110 increases, the viscosity of the stop-off material 110 increases. Thus, if the stop-off material 110 is difficult to dispense from a syringe 102, the gauge of the needle 108 could be increased and/or the amount of magnesium oxide in the stop-off material 110 could be decreased to decrease viscosity as long as 20 wt % to 40 wt % of the stop-off material 110 comprises magnesium oxide. When more than 60 wt % of the stop-off material 110 comprises magnesium oxide, the stop-off material 110 is nearly unworkable because it is too thick. In some embodiments, one or more of the base materials have small gaps or crevices that need protection from the brazing filler material during brazing, but the small gaps or crevices may be too small for a syringe tip to access. In some such embodiments, the weight percent of magnesium oxide in the stop-off material 110 is reduced to form a stop-off material 110 that can flow into those small gaps or crevices due to its low viscosity and high slump. For example, in some such embodiments, about 20 wt % of the stop-off material 110 may comprise magnesium oxide.

In some other embodiments and applications, for example, in the industrial gas turbine industry, about 20 wt % to about 30 wt % of the stop-off material 110 may comprise magnesium oxide, In yet some other embodiments and applications, for example, in the aviation industry, about 30 wt % to about 40 wt % of the stop-off material 110 may comprise magnesium oxide. In some embodiments, about 25 wt % of the stop-off material 110 comprises magnesium oxide as this is weight percent provides a versatile stop-off material 110 having a favorable balance of properties such as the braze-prohibiting properties, slump, viscosity, extrusion, and ease of reside removal post-brazing.

In some embodiments, the stop-off material 110 may comprise another metal-oxide in addition to the magnesium oxide. For example, in some embodiments, the stop-off material 110 comprises magnesium oxide and one or more other metal-oxides including but not limited to titanium oxide, aluminum oxide, chromium oxide, nickel oxide, yttrium oxide, and zirconium oxide. In some embodiments, a ratio between the weight percent of the maximum oxide to a total weight percent of one or more metal-oxides in the stop-off material may be from about 1:20 to about 20:1. The more magnesium oxide in the stop-off material 110, the easier it is to remove the stop-off material 110 after brazing while also limiting residue.

FIGS. 8, 9, 10, 11, and 12 illustrate some embodiments of another method for using the stop-off material 110 for brazing two substrates together. It will be appreciated that the various materials and parameters described in the method of FIGS. 1-7 may also apply to the same materials and parameters in the method of FIGS. 8-12. Thus, in some embodiments, the stop-off material 110 is used in a brazing process on a single component (e.g., FIGS. 1-7), whereas in other embodiments, the stop-off material 110 may be used to join two or more components to one another (e.g., FIGS. 8-12)

Figure 8:
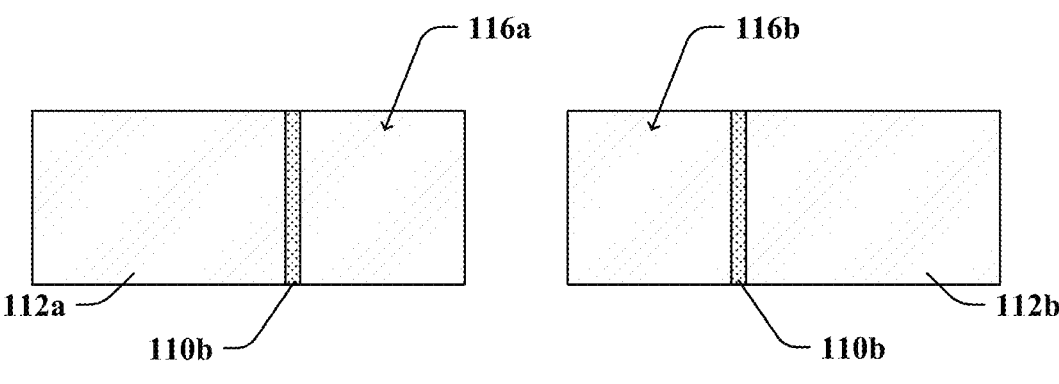
FIGS. 8, 9, 10, 11, and 12 illustrate some embodiments of another method for using a stop-off material for brazing two substrates together.
Figure 9:
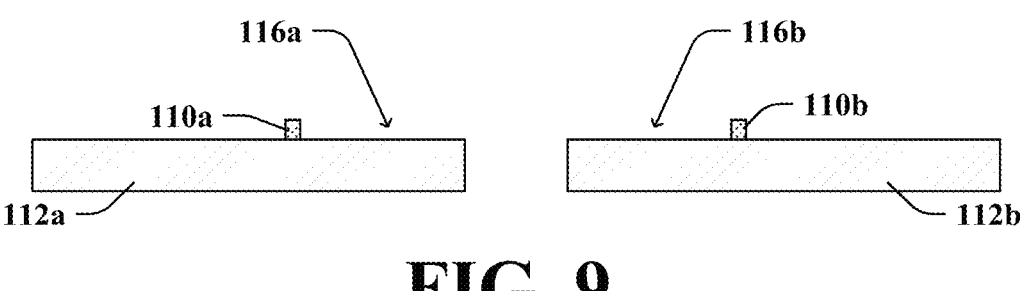

Turning to FIG. 8, a top-view of a first substrate 112a and a second substrate 112b is illustrated. Turning additionally to FIG. 9, a side-view of the first and second substrates 112a, 112b is illustrated. In some embodiments, a first stop-off material 110a is applied in a line on the first substrate 112a to define a first brazing area 116a of the first substrate 112a. Similarly, in some embodiments, a second stop-off material 110b is applied in a line on the second substrate 112b to define a second brazing area 116a of the second substrate 112a. Thus, in some such embodiments, only one boundary of the first brazing area 116a and the second brazing area 116b is defined by the stop-off material 110; other boundaries of the first and second brazing areas 116a, 116b are defined by edges of the substrates 112a, 112b.

The first and second stop-off materials 110a, 110b may comprise the same composition as described previously with respect to the stop-off material 110 in FIGS. 1-7. In other embodiments, the first and second stop-off materials 110a, 110b may have different compositions than one another. For example, in some embodiments, if the substrates 112a, 112b comprise different materials, the first and second stop-off materials 110a, 110b may have different compositions more suited to wet the different materials of the first and second substrates 112a, 112b. In some embodiments, the first and second stop-off materials 110a, 110b still comprise magnesium oxide for easy removal and mitigation of residue post-brazing.

Figure 10:
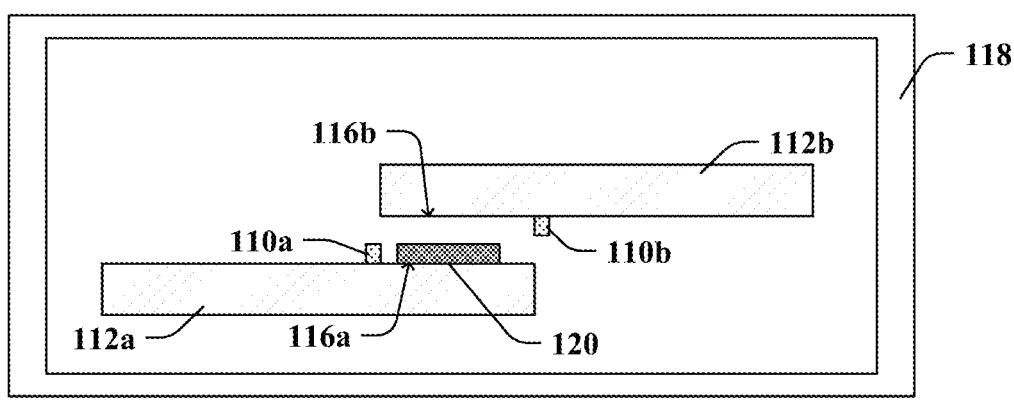

Turning to FIG. 10, a brazing filler material 120 is applied to at least the first brazing area 116a of the first substrate 112a. In some embodiments, the first and second substrates 112a, 112b are also oriented within a furnace 118 such that the first brazing area 116a faces the second brazing area 116b. In some other embodiments, a brazing filler material is also applied to the second brazing area 116b of the second substrate 112b.

Figure 11:
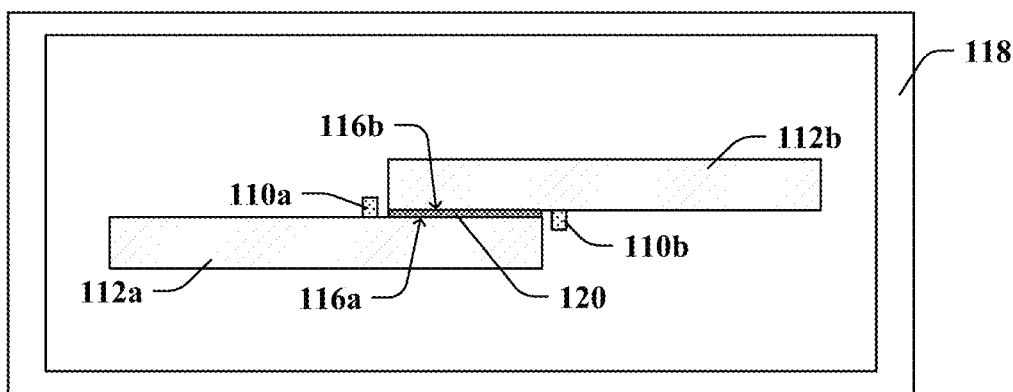

Turning to FIG. 11, the furnace 118 is set to the second temperature to perform brazing. During brazing, the brazing filler material 120 is held in place via capillary action between the first and second substrates 112a, 112b to join the first and second substrates 112a, 112b to one another at the first and second brazing areas 116a, 116b. Because the stop-off materials 110a, 110b only bound one side of the brazing areas 116a, 116b, the brazing filler material 120 may overflow onto sidewalls of the substrates 112a, 112b. Thus, in some other embodiments, the stop-off materials 110a, 110b may also be applied on the sidewalls of the substrates 112a, 112b (not shown), for example to prevent overflow onto the sidewalls. Further, in some embodiments, the brazing filler material 120 does not flow over the entire first and/or second brazing areas 116a, 116b. Thus, in some embodiments, the brazing filler material 120 does not contact and thus, is spaced apart from the first and/or second stop-off materials 110a, 110b after brazing.

Figure 12:
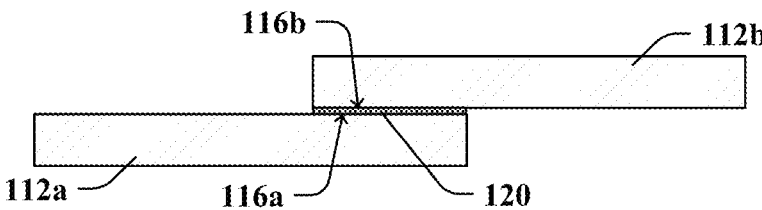

Turning to FIG. 12, in some embodiments, the first and second substrates 112a, 112b are removed from the furnace 118 and cooled to the third temperature. The first and second substrates 112a, 112b are joined together at the first and second brazing areas 116a, 116b via the brazing filler material 120. The stop-off material 110a, 110b is then removed via air pressure, soft brushing, acetone, or some other suitable removable method.

FIGS. 8-12 illustrate the use of a stop-off material 110a, 110b to form a lap-joint between two substrates 112a, 112b. It will be appreciated that the stop-off material 110a, 110b may also be used in other joining processes and to produce other types of joints such as, for example, a butt-joint, a corner-joint, an edge-joint, a tee-joint, a cylindrical lap-joint, a pre-sintered preform dimensional build-up joint, a combination of these joints, or the like.

FIGS. 13, 14, 15, and 16 illustrate some embodiments of yet another method for applying a stop-off material in cooling thru-holes to prevent a brazing filler material from filling the cooling thru-holes during brazing. It will be appreciated that the various materials and parameters described in the method of FIGS. 1-7 and/or the method of FIGS. 8-12 may also apply to the same materials and parameters in the method of FIGS. 13-16.

Figure 13:
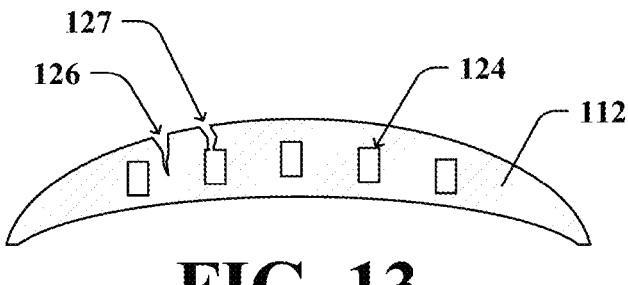
FIGS. 13, 14, 15, and 16 illustrate some embodiments of yet another method for applying a stop-off material in cooling thru-holes to prevent a brazing filler material from filling the cooling thru-holes during brazing.

Turning to FIG. 13, in some embodiments, the substrate 112 or component for brazing may comprise cooling thru-holes 124 that extend through the length of the substrate 112. The cooling thru-holes 124 may be used in a final product for cooling, transfer of fluids, housing of other components, or some other function. For example, in some embodiments, the substrate 112 is a blade or vane for a turbine, and thus, the cooling thru-holes 124 allow air flow through the blade or vane during operation for cooling. It will be appreciated that in other embodiments, the shape of the cross-section of the cooling thru-holes 124 may be, for example, a circle, square, oval, rectangle, or some other shape.

Further, in some embodiments, the substrate 112 or component may comprise a first crack 126 or defect that needs repaired. In some such embodiments, brazing may be used to repair the first crack 126 with a wide gap brazing filler metal, for example. In some embodiments, the substrate 112 or component may comprise a second crack 127 or defect, wherein the second crack 127 extends into and exposes one of the cooling thru-holes 124.

Figure 14:
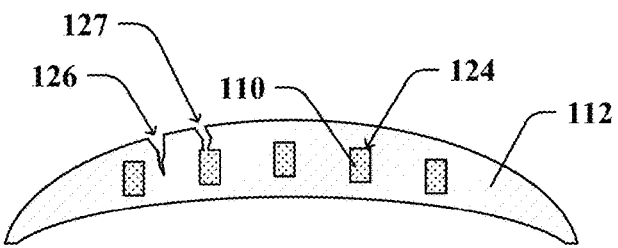

Turning to FIG. 14, the cooling thru-holes 124 are filled with the stop-off material 110. In some embodiments, the diameter of the cooling thru-holes 124 are less than 0.1 inches and thus, the stop-off material 110 is formulated to have a viscosity thin enough to effectively fill these cooling thru-holes 124. In other embodiments, the cooling thru-holes 124 may have a diameter greater than 0.1 inches. In some embodiments, the stop-off material 110 may be applied to fill the cooling thru-hole 124 exposed by the second crack 127 while leaving the second crack 127 above the cooling thru-hole 124 unfilled.

Figure 15:
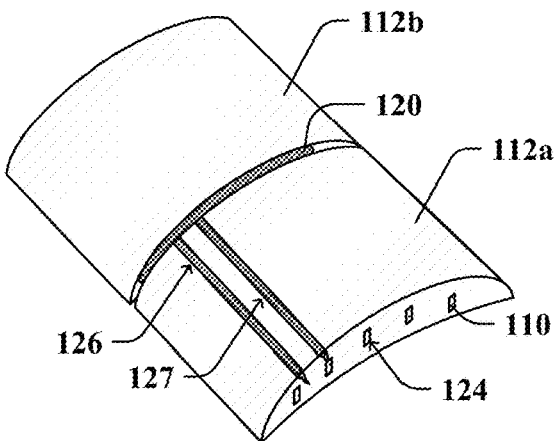

Turning to FIG. 15, a first substrate 112a comprising the cooling thru-holes 124 is joined to a second substrate 112b via a brazing filler material 120. In some embodiments, the brazing filler material 120 may flow and stay between the first and second substrates 112a, 112b via capillary action. In other embodiments, the brazing filler material 120 flows between the first and second substrates 112a, 112b due to its viscosity, adhesive forces with the substrate 112a, cohesive forces, gravity, and the like. It will be appreciated that the brazing may be performed within a furnace as discussed in, for example, FIGS. 4-5 and FIGS. 10-11. The stop-off material 110 prevents the brazing filler material 120 from entering the cooling thru-holes 124. The cooling thru-holes 124 extend through the length of the first substrate 112a and thus, the stop-off material 110 may contact the brazing filler material 120.

Further, in some embodiments, the brazing filler material 120 may also be applied to fill the first crack 126 and the second crack 127 of the first substrate 112a. As the furnace temperature rises and the brazing filler material 120 melts, the stop-off material 110 still protects the cooling thru-holes 124 from the brazing filler material 120. The brazing filler material 120 may flow and fill the first and second cracks 126, 127 via capillary action. In other embodiments, the brazing filler material 120 spreads throughout the first and second cracks 126, 127 due to its viscosity, adhesive forces with the substrate 112a, cohesive forces, gravity, and the like. Thus, in some embodiments, the stop-off material 110 may be used for repairing a monolithic component and/or to repair a junction between two components by brazing.

Figure 16:
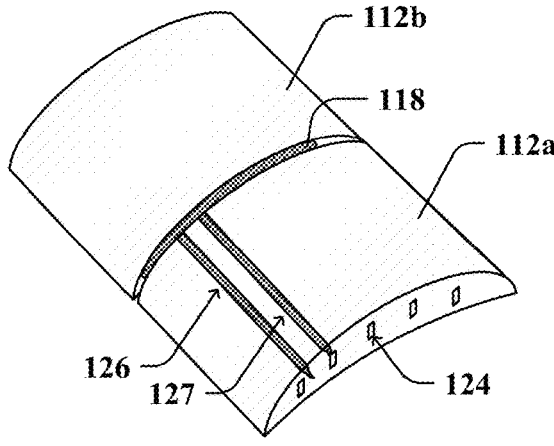

Turning to FIG. 16, the stop-off material 110 is removed from the cooling thru-holes 124 such that the cooling thru-holes 124 are open and may be preserved for function in operation. In some embodiments, as shown in FIG. 16, the cooling thru-hole 124 exposed by the second crack 127 can be restored upon removal of the stop-off material 110. In some embodiments, the stop-off material 110 may be removed via air pressure, a brush, acetone, or the like. In some other embodiments, because of the small size of the cooling thru-holes 124 across a comparatively long length, a wire may be used to remove the stop-off material 110 from the cooling thru-holes 124. For example, in some embodiments, a copper or aluminum wire having a diameter less than 0.05 inches may be used to remove the stop-off material 110 from the cooling thru-holes 124. The copper or aluminum wires are soft enough to prevent damage to the cooling thru-holes 124 during removal of the stop-off material 110. When the stop-off material 110 prior to brazing comprises 20 wt % to 40 wt % magnesium, then the stop-off material 110 is effective in preventing the brazing filler material 120 from entering the cooling thru-holes 124 without staining or leaving residue within the cooling thru-holes 124 or the substrate 112 after removal. Because the stop-off material 110 is easy to clean, expensive and time consuming processes to clean the cooling thru-holes 124, such as electric discharge machining or laser ablation, are avoided.

It will be appreciated that the stop-off material 110 may be used to prevent the spread of a molten material past a boundary defined by the stop-off material 110 in joining processes other than brazing. In some embodiments, the stop-off material 110 may be used in a soldering application, diffusion bonding, diffusion brazing, wide gap brazing, or other joining processes. For example, a stop-off material 110 may define an area for soldering on one or more base materials when solder is applied to the one or more base materials via spraying. Additionally, the stop-off material 110 may be used in other brazing processes other than furnace brazing, such as, for example, in vacuum brazing, induction brazing, resistance brazing, or some other brazing process.

Figure 17:
FIG. 17 illustrates some embodiments of the stop-off material in a preform.

FIG. 17 illustrates some embodiments of a stop-off preform 1710 configured to prevent a molten brazing filler material from spreading onto an underlying surface. The stop-off preform 1710 is a thin, semi-flexible material. The stop-off preform 1710 is capable of being flexed without crumbling. For example, in some embodiments, the stop-off preform 1710 can be rolled or folded without breaking. The stop-off preform 1710 is capable of being cut-to-shape for its intended use. In other embodiments, the stop-off preform 1710 may be in the form of a rigid rod-like, plate-like, or some other suitable structure. The stop-off preform 1710 comprises magnesium oxide suspended in a cured resin. For example, in some embodiments an acrylic resin comprising a methyl methacrylate monomer may be used.

In some embodiments, the stop-off preform 1710 is formed by first thoroughly mixing magnesium oxide with a hardener liquid, and then, an acrylic powder is added to the mixture and continue to mix until a homogenous mixture is formed. The mixture will begin to cure upon adding the acrylic powder. Thus, the acrylic powder is added last so that the mixture does not cure before being formed into the desired shape. In some embodiment, the mixture is then formed into a flat sheet and allowed to cure. In some embodiments, a tape casting machine is used to form the flat sheet, and a doctor blade is used to control the thickness of the flat sheet. The thickness of the flat sheet may depend upon the end use of the stop-off preform 1710. For example, if being used to prevent braze from entering an opening, such as the cooling thru-holes 124 illustrated in FIG. 13, then the thickness of the flat sheet will be set such that the resulting stop-off preform 1710 fits within that opening. In some embodiments, the thickness of the stop-off preform 1710 may be in a range of between, for example, approximately 0.1 millimeters to approximately 1 centimeter. In some embodiments, the mixture is cured via moisture in the air.

In some other embodiments, the stop-off preform 1710 can be formed by a molding process. In the molding process, the same homogenous mixture may be formed by first thoroughly mixing magnesium oxide with a hardener liquid, and then, adding an acrylic powder to the mixture. Then, the homogeneous mixture may be transferred into a syringe or other dispensing tool. The syringe may then dispense the homogenous mixture into a mold. The mixture is left in the mold while it cures into the stop-off preform 1710. Once curing is complete, then the stop-off preform 1710 is removed from the mold and is ready for use. Thus, the stop-off preform 1710 can take on a variety of shapes and structures based on the mold used. The desired shape of the stop-off preform 1710 depends on the end usage of the stop-off preform 1710.

The weight percent of magnesium oxide within the stop-off preform 1710 influences the curability, flexibility, and removability post-brazing of the stop-off preform 1710. In some embodiments, the stop-off preform 1710 may comprise about 5 wt % to about 30 wt % magnesium oxide. For example, in one embodiment, the stop-off preform 1710 comprises about 40 wt % to about 45 wt % hardener liquid, about 25 wt % to about 28 wt % of magnesium oxide, and about 28 wt % to about 32 wt % of acrylic powder. In another embodiment, the stop-off preform 1710 comprises about 35 wt % to about 40 wt % hardener liquid, about 22 wt % to about 26 wt % of magnesium oxide, and about 35 wt % to about 40 wt % of acrylic powder. In yet another embodiment, the stop-off preform 1710 comprises about 45 wt % to about 50 wt % hardener liquid, about 5 wt % to about 10 wt % of magnesium oxide, and about 42 wt % to about 48 wt % of acrylic powder. The magnesium oxide increases the flexibility of the stop-off preform 1710 and provides the stop-off properties of the stop-off preform 1710 during brazing. Further, because any amount of magnesium oxide can provide some stop-off effect, in some other embodiments, about 0.25 wt % to about 100 wt % of the stop-off preform 1710 comprises magnesium oxide.

In some embodiments, the stop-off preform 1710 may comprise another metal-oxide in addition to the magnesium oxide. For example, in some embodiments, the stop-off preform 1710 comprises magnesium oxide and one or more other metal-oxides including but not limited to titanium oxide, aluminum oxide, chromium oxide, nickel oxide, yttrium oxide, and zirconium oxide. In some embodiments, a ratio between the weight percent of the maximum oxide to a total weight percent of one or more metal-oxides in the stop-off material may be from about 1:20 to about 20:1. The more magnesium oxide in the stop-off preform 1710, the easier it is to remove the stop-off preform 1710 after brazing while also limiting residue.

Figure 18:
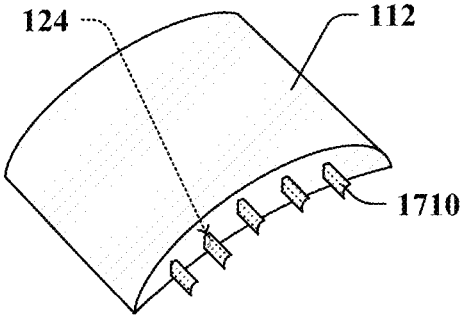
FIG. 18 illustrates some embodiments of the stop-off material in preform inserted into cooling thru-holes before brazing.

FIG. 18 illustrates some embodiments of the stop-off preform 1710 inserted into the cooling thru-holes 124 of a substrate 112 prior to brazing. It will be appreciated that one of the cooling thru-holes 124 is labeled and illustrated with dotted lines because the cooling thru-hole 124 is covered up by the stop-off preform 1710 in FIG. 18. In some such embodiments, the stop-off preform 1710 is rolled and inserted into the cooling thru-holes 124. Thus, the stop-off preform 1710 is rigid enough to take the shape of the cooling thru-holes 124. In some other embodiments, the stop-off preform 1710 remains as a thin sheet and is inserted into a small slot-like area of a component.

As discussed in previous embodiments, the substrate 112 may then undergo a brazing process to join the substrate 112 with one or more components and/or to repair defects in the substrate 112. When the substrate 112 is heated during brazing, the resin in the stop-off preform 1710 breaks down and loosely holds its shape while still suspending the magnesium oxide. After brazing, when the substrate 112 has cooled, the stop-off preform 1710 may be removed with a wire, compressed air, acetone, a soft brush, or some other suitable removal method. Because of the magnesium oxide, little-to-no residue is left within the cooling thru-holes 124.

FIG. 19 provides a flow chart that shows the steps of some embodiments of the methods described above.

At step 1902, a stop-off material is applied to a substrate to define a brazing area on the substrate. The stop-off material comprises magnesium oxide.

At step 1904, a brazing filler material is applied to the brazing area of the substrate at a first temperature.

At step 1906, the substrate is placed in a furnace set to a second temperature higher than the first temperature to melt the brazing filler material. For example, in some embodiments, the second temperature is at least 50 degrees Celsius higher than the liquidus temperature of the brazing filler material to ensure the brazing filler material is fully melted and free-flowing.

At step 1908, the substrate is cooled to a third temperature lower than the second temperature.

At step 1910, the stop-off material is removed from the substrate.

The aforementioned systems, components, (e.g., stop-off material, metal surfaces, brazing methods, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A stop-off material comprising:
a solvent;
a thickener, wherein the solvent and the thickener together form a solvent-thickener mixture, wherein 1 wt % to 3 wt % of the solvent-thickener mixture comprises the thickener; and
magnesium oxide, wherein 5 wt % to 60 wt % of the stop-off material comprises the magnesium oxide.

2. The stop-off material of claim 1, wherein the solvent is water.

3. The stop-off material of claim 1, wherein the solvent is not water-based.

4. The stop-off material of claim 1, wherein 70 wt % to 80 wt % of the stop-off material comprises the solvent.

5. The stop-off material of claim 1, wherein about 20 wt % to about 40 wt % of the stop-off material comprises the magnesium oxide.

6. The stop-off material of claim 1, wherein about 25 wt % of the stop-off material comprises the magnesium oxide.

7. The stop-off material of claim 1, further comprising a second metal-oxide different than magnesium oxide.

8. The stop-off material of claim 1, wherein the solvent, the thickener, and the magnesium oxide form a paste.

9. The stop-off material of claim 1, wherein the solvent, the thickener, and the magnesium oxide form a preform.

10. A stop-off material comprising:

water;

a thickener comprising a polymer, wherein the water and the thickener together form a water-thickener mixture, wherein 0.5 wt % to 3 wt % of the water-thickener mixture comprises the thickener; and magnesium oxide.

11. The stop-off material of claim 10, wherein about 20 wt % to about 40 wt % of the stop-off material comprises the magnesium oxide.

12. The stop-off material of claim 1, wherein about 30 wt % to about 40 wt % of the stop-off material comprises the magnesium oxide.

13. The stop-off material of claim 1, further comprising a cross-linking agent, wherein the solvent comprises water such that the solvent-thickener mixture is a water-thickener mixture, wherein the water-thickener mixture further comprises the cross-linking agent, and wherein about 2 wt % to about 7 wt % of the water-thickener mixture comprises the cross-linking agent.

14. The stop-off material of claim 1, wherein the thickener comprises a polymer.

15. The stop-off material of claim 10, wherein about 30 wt % to about 60 wt % of the stop-off material comprises the magnesium oxide.

16. The stop-off material of claim 10, wherein about 30 wt % to about 40 wt % of the stop-off material comprises the magnesium oxide.

17. The stop-off material of claim 10, further comprising a cross-linking agent, wherein the water-thickener mixture further comprises the cross-linking agent, and wherein about 2 wt % to about 7 wt % of the water-thickener mixture comprises the cross-linking agent.

18. A stop-off material comprising:

a water-thickener mixture comprising:

water, a thickener, and a cross-linking agent, wherein about 2 wt % to about 7 wt % of the water-thickener mixture comprise the cross-linking agent; and magnesium oxide.

19. The stop-off material of claim 18, wherein the thickener comprises a polymer.

20. The stop-off material of claim 18, wherein 5 wt % to 60 wt % of the stop-off material comprises the magnesium oxide.

\* \* \* \* \*